Patented Apr. 15, 1924.

1,490,703

UNITED STATES PATENT OFFICE.

KARL BARRÉ LAMB, OF NEW YORK, N. Y.

RUBBER COMPOSITION.

No Drawing.   Application filed February 2, 1922. Serial No. 533,553.

*To all whom it may concern:*

Be it known that I, KARL B. LAMB, a citizen of the United States, residing at New York city, in the county of New York, State of New York, have invented certain new and useful Improvements in Rubber Compositions; and I do hereby declare the following to be a full, clear, and exact description of the invention, such as will enable others skilled in the art to which it appertains to make and use the same.

The present invention relates to rubber compositions of a composite character, and particularly to compositions of the character in which black pigments are used.

In the manufacture of rubber compositions it is customary to compound with the rubber various compounding ingredients, such as pigments, fillers, and inorganic materials of various kinds to give to the rubber the desired physical and other properties. For making black or grey rubber compositions, lamp black and gas black are frequently used. These black pigments, however, are lacking in body, and, where inorganic compounding ingredients are desired for adding body to the compositions and to reduce the pure rubber content, other pigments or fillers than the carbon black or lamp black are added.

According to the present invention, the rubber compositions are made with the incorporation therewith of a composite black pigment of an intense black color which nevertheless combines in its properties those of a body-giving filler or compounding material with those of a color-giving pigment. The invention is characterized by the compounding with the rubber and other ingredients of such a composite pigment, that is, one which combines in a single composite material, both a filler or body-giving material and a black pigment, so intimately associated with each other that a relatively large amount of the filler or body-giving material is present without destroying the desired black properties of the composition.

The composite pigments or compounding material utilized in the new compositions are made from spent fuller's earth which is a by-product commonly considered to have little if any value and frequently thrown away as worthless. The spent fuller's earth is that which results from the refining and decolorizing of oils and fats (for example, vegetable oils and fats such as cottonseed oil) with fuller's earth, which loses its effectiveness after a certain period of use and becomes what is commonly known as "spent." After the removing of as much as possible of the oil therefrom, the spent fuller's earth still contains a considerable amount of oil admixed therewith. Upon subjecting the spent fuller's earth to a regulated carbonizing operation, the oil in the spent earth is carbonized and converted into a black pigment in most intimate distribution with respect to the fuller's earth base so that the product of the regulated carbonization operation is a composite product with the carbon from the oil combined in an integral or intimate manner with the fuller's earth base.

The production of the composite pigment may be carried out in various ways of which the following illustrations are specific examples:

The spent fuller's earth, having the oil intimately distributed throughout its mass, may be placed in an open pan and heated by direct flame until the gases resulting from the decomposition of the oil are ignited. The heating of the earth should be then discontinued or so regulated that the mass of earth and oil burns quietly. The burning should be carried out at as low a temperature as possible, and the mass should be stirred continually or from time to time throughout the operation. As the carbonization progresses, the earth becomes black in color until the product as a whole is an intense black. The further heating of the mass should be then stopped, so that the product may cool.

While carbonization may be satisfactorily accomplished in the manner described, a preferred method for the commercial production of the pigment is to carbonize it in a closed retort or rotary furnace, preventing oxidation as much as possible by the proper control of the air in the retort or furnace. The heating should be regulated so that the mass of earth and oil burns quietly. A rotary furnace provides an automatic stirring of the material and also allows a better recovery in the furnace itself, of lamp black formed from the burning of the oil. After the carbonization has progressed to such a point that all the oil has been carbonized, heating should be stopped in order to prevent oxidation, and the resulting product allowed to cool. When the carbonized material prepared in either of the ways described is cool, it can be discharged and then ground in a ball mill until a sufficient degree of fineness for pigment purposes is obtained.

During the carbonizing operation a considerable amount of "smoke" is formed from the decomposition of the oil content of the spent fuller's earth, particularly if the burning, carbonizing, and stirring operations are carried on at a low temperature, and with limited access of air. The finely divided carbon of this smoke appears to be precipitated in part throughout the fuller's earth, although a considerable amount of it escapes as smoke with the gaseous products of the carbonizing operation. This smoke can be treated for the precipitation and recovery of the carbon or lamp black therefrom, in much the same way that lamp black is recovered when made from oil. The lamp black thus separately recovered is itself a valuable product and can be separately used in place of lamp black made from other sources. It can also be advantageously combined with the composite black pigment formed by carbonizing the spent fuller's earth itself, thereby increasing the intensity of the black color of the composite pigment by adding a certain percentage of the separately collected lamp black thereto.

The decomposition and carbonization of the oil throughout the mass of the fuller's earth results in a most intimate production and deposition of the carbon black in and upon the particles of the earth, so that the product has an intense black color. The black color thus imparted to the earth may be considered to be due to three causes, namely, (1) to the actual formation of finely divided carbon from the oil within the body of the fuller's earth; (2) the precipitation of the oil smoke in a finely divided state within the mass of the fuller's earth; and (3) the incorporation of the lamp black separately precipitated from the smoke, when this separately produced lamp black is admixed with the original composite pigment. As a result of this intimate production and deposition of the carbon black in and upon the particles of the earth, even though but a small percentage of the total weight of the composite pigment is made of the carbon black, the whole product is nevertheless of an intense black color. The fuller's earth, which is itself of a porous structure, appears to be intimately coated or plated with the deposited black. As a result, the composite product, although of an intense black color, nevertheless has a relatively large amount of fuller's earth intimately combined therewith, so that the composite pigment can be used to particular advantage for purposes where a pigment having considerable body, as well as an intense black color, is desired.

The composite pigment obtainable in the manner above described forms a valuable compounding material for making rubber compositions and imparts to the compositions characteristic properties. Although the composite pigment has a considerable body, it nevertheless is of an intense black color, and it can be used where body-giving compounding ingredients are desired and where, in addition, a black or grey color is also desired in the rubber composition.

The compounding of the composite pigment with the rubber and other ingredients (such as vulcanizing agent, etc.) can be effected in the usual way, for example, by adding the composite pigment while the rubber is being masticated on the rubber mill. The resulting composition can then be subjected to vulcanization in much the usual way. For making the compositions of products of different characters and for different purposes, other and varying compounding ingredients can also be used. So also, the compositions may be soft rubber compositions, vulcanized with a small amount of sulfur, or they may be hard rubber compositions, made with a larger amount of sulfur.

The present application is in part a continuation of my prior application Ser. No. 464,986, filed April 27, 1921, in which the composite pigment itself is claimed, together with the method of its production, the claims for the rubber composition of the present invention having been cancelled therefrom in compliance with the official requirement for division.

I claim:

1. A rubber composition comprising rubber and a composite pigment made from spent fuller's earth by a heating and carbonizing operation.

2. A rubber composition comprising rubber and a composite black pigment resulting from the carbonization of spent fuller's earth under conditions to develop an intense black color.

3. A rubber composition comprising rubber and a composite black pigment, said pigment being made up of a body-giving pigment base and a carbonized black pigment coating and integrally combined with the base.

In testimony whereof I affix my signature.

KARL BARRÉ LAMB.